United States Patent [19]
Nadler

[11] 3,965,705
[45] June 29, 1976

[54] METHOD AND APPARATUS FOR ATTACHING AND LOCKING AN ARTICLE TO A MOUNTING STRUCTURE

[76] Inventor: Marshall Nadler, 2391 Knob Hill Drive, North Bellmore, N.Y. 11710

[22] Filed: Aug. 6, 1975

[21] Appl. No.: 602,833

[52] U.S. Cl. .................................... 70/58; 70/13; 248/203
[51] Int. Cl.² ........................................ E05B 73/00
[58] Field of Search ............... 70/5, 13, 57, 58, 258, 70/DIG. 57; 248/203; 211/4

[56] References Cited
UNITED STATES PATENTS

| | | | |
|---|---|---|---|
| 564,515 | 7/1896 | Glover | 70/13 |
| 3,410,122 | 11/1968 | Moses | 70/58 |
| 3,563,070 | 2/1971 | Earl | 70/58 |
| 3,673,828 | 7/1972 | Jones | 70/58 |

Primary Examiner—Robert L. Wolfe
Attorney, Agent, or Firm—Posnack, Roberts & Cohen

[57] ABSTRACT

Apparatus for attaching and locking an article to a mounting structure comprising a turnable lock having locked and unlocked states and a support rotatably supporting the lock thereon for displacement between first and second positions corresponding respectively to the locked and unlocked states. The support can be attached to an article. A bracket is intended to be attached to a mounting structure and the bracket is provided with an aperture of such a shape to allow passage of the lock therethrough in the unlocked state. In the locked state, the lock blocks removal thereof from the bracket.

19 Claims, 7 Drawing Figures

METHOD AND APPARATUS FOR ATTACHING AND LOCKING AN ARTICLE TO A MOUNTING STRUCTURE

FIELD OF THE INVENTION

The invention relates to methods and apparatus for attaching and locking an article to a mounting structure. More specifically, the invention is concerned with methods and apparatus for locking electronic instruments such as transceivers or the like to a mounting structure such as the dashboard of a vehicle.

BACKGROUND OF THE INVENTION

At present, a wide variety of electronic instruments are employed in various vehicles, said instruments being separately purchased for mounting in the vehicle. Specific examples of such electronic instruments are transceivers, CB radios, scanners, marine radios, car tape players and the like, and such vehicles can be automobiles, trucks, boats and airplanes.

The electronic instruments are generally relatively expensive and it is intended that they be capable of installation in the vehicle with some measure of theft prevention. It is also important that the instruments can be easily installed and readily removable for purposes of repair or for use outside the vehicle.

At present there are a great variety of mounting devices for electronic instruments in vehicles.

In general, a bracket or similar structural element is fixed to the vehicle by means of suitable fasteners and the instrument is then fixed to the bracket. In this sequence of operations, the fasteners which attach the instrument to the bracket are usually accessible.

In the case of easily removable instruments they are mounted on a slide which is removable from the bracket and a lock or similar means is employed to selectively prevent such removal.

The available mounting devices have been found to be deficient both as regards reliability and security.

SUMMARY OF THE INVENTION

An object of the invention is to provide a device for attaching and locking an article to a mounting structure which is of simple construction and is easily operated while providing maximum security.

A further object of the invention is to provide apparatus of the above character which enables rapid removal of the article and easy installation thereof.

A further object of the invention is to provide apparatus of the above character which is essentially universal in mounting capability and thereby is adapted for use with a variety of different sizes of articles.

The invention is characterized by the feature of built-in locks capable of being secured to the article to be mounted.

More particularly, the invention contemplates a device for attaching and locking an article to a mounting structure, said device comprising a locking means having locked and unlocked states, a support means supporting said locking means thereon for displacement between first and second positions corresponding respectively to said locked and unlocked states, said support means being adapted for attachment to an article, and bracket means adapted for attachment to a mounting structure, said bracket means having an aperture shaped to allow passage of said locking means said locking means blocks removal thereof from said bracket means via said aperture, while in the unlocked state of the locking means said locking means can be passed through the aperture to be separated from the bracket means.

The invention further contemplates that said support means is shaped to prevent complete passage thereof through the aperture in the bracket means.

Preferably, the locking means is rotatably supported by the support means for movement between the locked and unlocked position and the aperture in the bracket means is non-circular. The locking means is in the form of an elongated locking member which in the locking position extends across the aperture and blocks passage therethrough whereas in the unlocking position the locking member is confined within the outline of the aperture to pass freely therethrough.

In a preferred embodiment, the aperture and locking member have the same shape and the support means comprises a base plate which supports the locking member and includes a raised portion which engages in the aperture so as to be non-rotatable therein.

In further accordance with the invention, the bracket means is in the form of a telescoping bracket member having opposite flanges thereon whose spacing is adjusted by the degree of telescoping of the bracket member. Preferably each flange of the bracket member has an aperture therein receiving a respective locking means.

The invention is further directed to a method of selectively locking an article to a bracket comprising forming said bracket as a telescoping member having opposed depending flanges whose spacing can be adjusted by refulating the degree of telescoping of the bracket, said brackets having apertures therein, attaching two locking members to an article at opposite sides thereof, positioning the article between the flanges, passing the locking members through the apertures, and locking said locking members so that they cannot be passed in reverse through said apertures.

The method of the invention contemplates that the locking members are locked by being turned 90°.

The invention will be described in greater detail hereafter with reference to the following detailed description taken in conjunction with the attached drawings.

DETAILED DESCRIPTION

Figure 1:
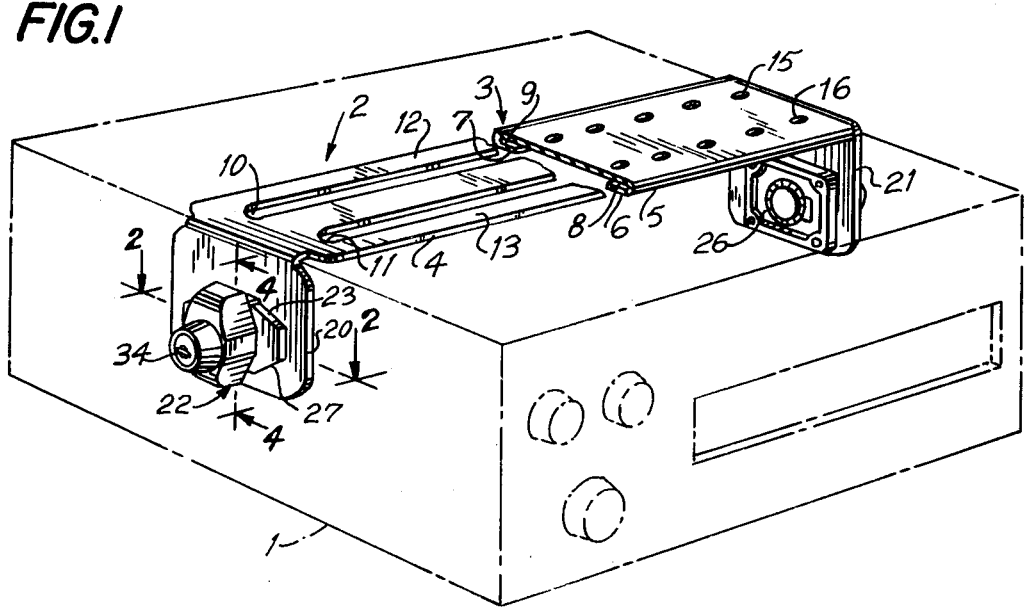
FIG. 1 is a perspective view showing the mounting and locking means of the invention by which an electronic instrument shown in chain dotted lines is releasably secured to a support structure.

Referring to the drawing, therein is shown a device for attaching and locking an electronic instrument 1 shown in chain dotted lines in FIG. 1 to a mounting structure indicated generally at numeral 2.

The article can be an electronic device of any type whatever, and by way of example, reference is made of articles of this class such as CB radios, marine radios, scanners, car tape players and the like. It is intended that these articles be mounted on any suitable support such as the dashboard of a vehicle.

The mounting structure is in the form of a support means constituted by a telescoping member 3 formed by telescoping elements or brackets 4 and 5. The telescoping element 5 is formed with laterally bent over flanges 6 and 7 forming respective slots 8 and 9. The telescoping element 4 is a flat plate with oblong apertures 10 and 11 therein. The element 4 has lateral edge portions 12, 13 which are respectively slidable in slots 7 and 6 of telescoping element 5.

The telescoping element 5 has two lines of holes 15, 16 and these holes are aligned with oblong apertures 10 and 11 such that when the elements 4 and 5 are telescopically engaged, the holes 15 and 16 will be accessible through the apertures 10 and 11.

The telescopic elements are respectively provided with flanges 20 and 21 and these flanges are spaced from one another by a distance which is regulated by the degree of telescopic engagement of element 4 within element 5.

The invention contemplates a means by which the article 1 can be fixedly secured to the flanges 20 and 21 of the brackets and in accordance with the invention there is provided a lock device 22 attached at opposite sides of the article for lockable engagement in apertures 23 in flanges 20 and 21.

Figure 2:
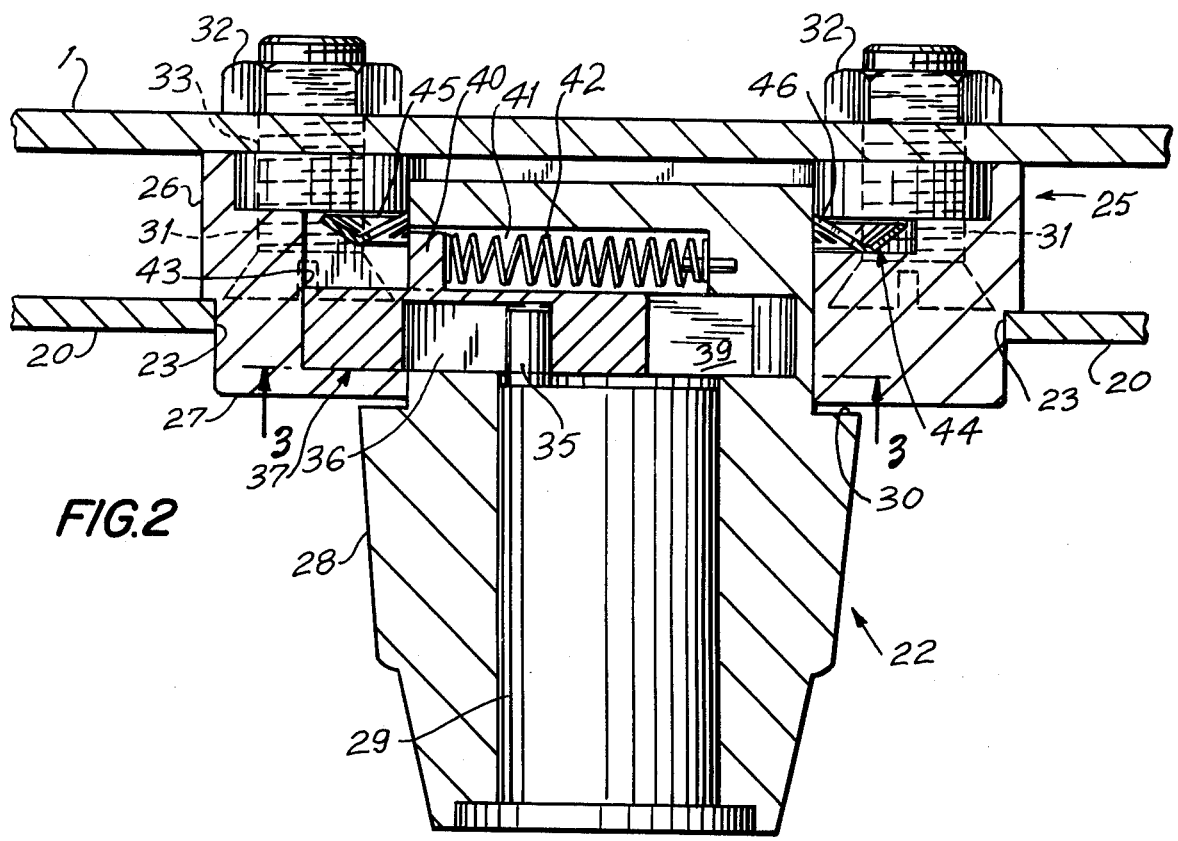
FIG. 2 is a sectional view on enlarged scale taken along lines 2—2 in FIG. 1 showing the locking means in locked position.
Figure 4:
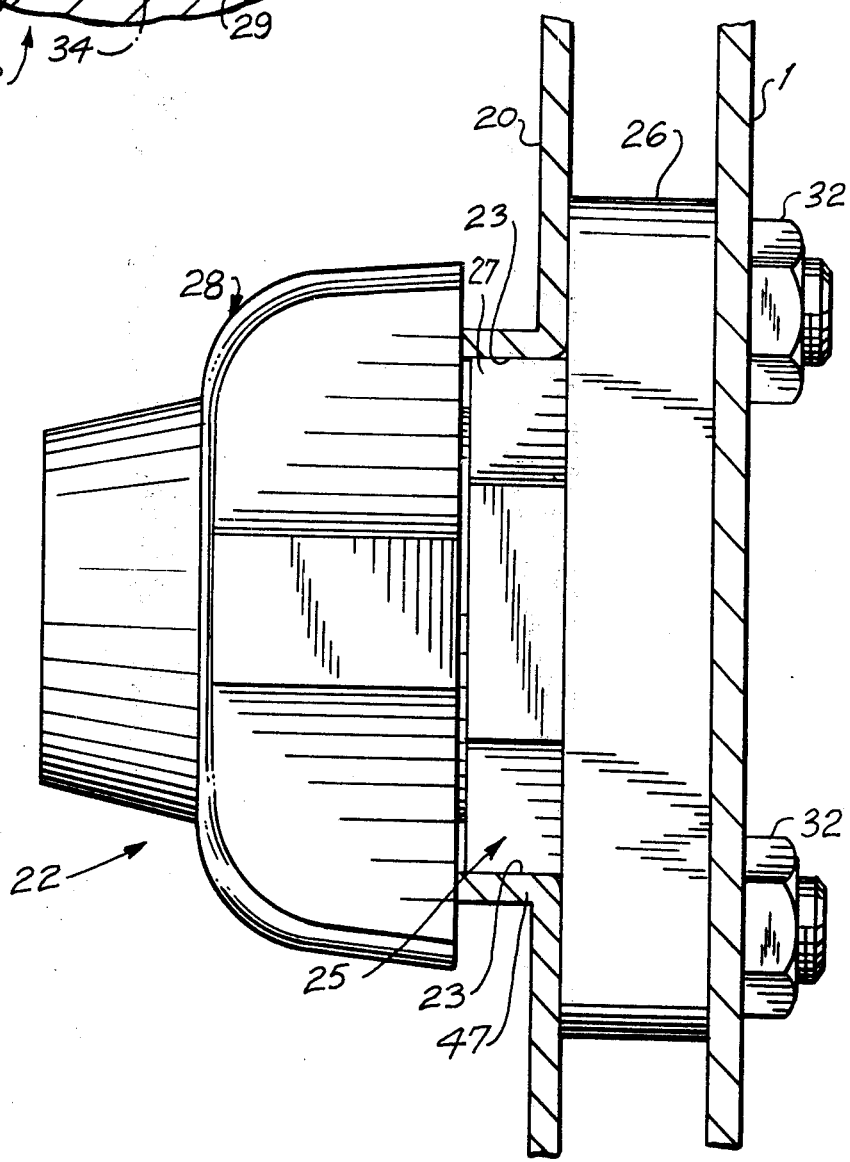
FIG. 4 is a sectional view taken through a flange of a bracket along line 4—4 in FIG. 1, the locking means being shown in locked position therein.

The lock device 22 essentially consists of a support 25 which is affixed to the article and a turntable lock member 28 which in the unlocked position is introduced through the aperture 23 and thereafter turned 90° to the locked position as shown in FIGS. 1, 2, and 4.

Figure 7:
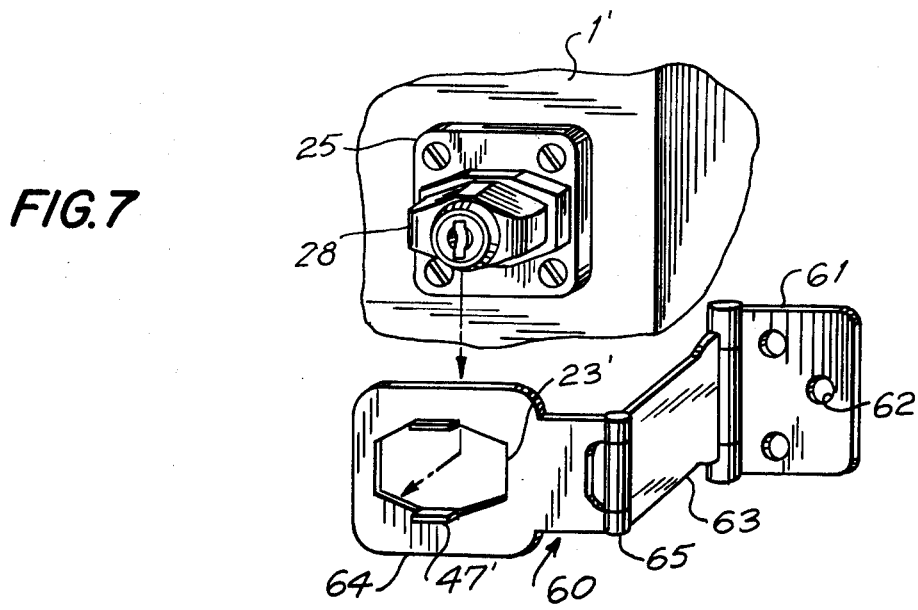
FIG. 7 is a perspective view, showing a modified arrangement of the mounting and locking means.

In particular, the support 25 comprises a base 26 and an integral raised portion 27 extending upwardly from the base. The raised portion 27 has the same shape as the aperture 23 and is insertable therein. In the given embodiment, the aperture and raised portion are non-circular and specifically of elongated octagonal shape. FIG. 7 which is directed to a modified arrangement of the bracket but otherwise has the same configuration of lock device reveals the the shape of the aperture at 23'.

The turntable locking member 28 contains a key-actuated lock cylinder 29. The rear face 30 of the locking member 28 has essentially the same shape as the raised portion 27 of the support. In one position the locking member 28 is aligned with the raised portion 27 and in the other position is at right angles thereto.

The locking member 28 is rotatably mounted within the support 25 for movement between the above two positions. In the position in which the locking member 28 is aligned with the raised portion 27 it is in the unlocked configuration whereas in the position at right angles to raised portion 27 it is in the locked configuration. FIG. 1 shows the locking member in the locked configuration. In the unlocked configuration, locking member 28 is passable through the aperture 23 so that the raised portion 27 can be introduced into the aperture as shown in FIGS. 2 and 4. After the locking member has been so passed through the aperture 23 it can be turned to the locked position in which it extends across the aperture 23 and can no longer be passed in reverse therethrough without being returned to the unlocking position as will be explained later.

The base 26 is provided with holes at the four corners thereof through which mounting bolts 31 can be passed. The mounting bolts can be engaged in the wall of article 1 and secured thereto by means of nuts 32 as seen in FIG. 2. Any alternative arrangement of attachment of support member 26 to the wall of the article is within the contemplation of the invention. In this regard it is contemplated that sleeves can be secured in holes 33 in article 1 and these sleeves can be internally threaded to receive threaded fasteners passed through the holes in base 26.

The cylinder 29 is of conventional construction and its interior details have not been shown since they are not essential to an understanding of the present invention. The cylinder 29 is of the type in which when the correct key is inserted in the key slot 34 therein the cylinder can be rotated within locking member 28.

The cylinder 29 carries an axially projecting pin 35 at the rear face thereof, said pin being received in a slot 36 in a latch member 37. The latch member 37 has flat sides 38 which are slidably received in a recess 39 in the locking member 28. The latch member 37 carries a fixed pin 40 which rides in a slot 41 in the locking member 28. A spring 42 is also supported in slot 41 and acts on pin 40 to urge the latch member 37 outwardly from slot 39 into a recess 43 in the support 25. When the latch is engaged in recess 43 the locking member is in its locked position. An annular spring retainer 44 is engaged in a recess 45 in the support 25 and the retainer has elastic radial elements 46 which tightly engage the surface of the locking member 28 to prevent axial movement thereof downwardly in FIG. 2 in the unlocked position.

Figure 3:
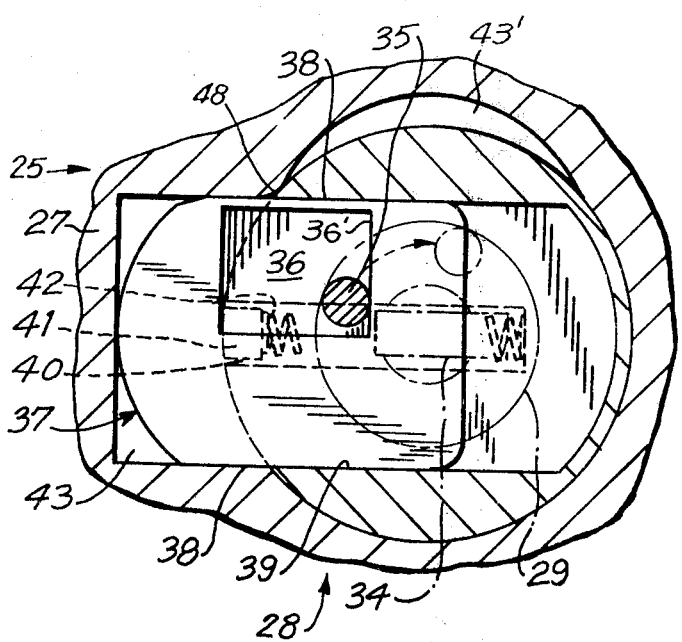
FIG. 3 is a sectional view on enlarged scale taken along line 3—3 in FIG. 2.

The pin 35 in the locked position is disposed at the right lower corner of the slot 36 in the latch member as shown in FIG. 3. In an unlocking operation, the key is inserted into cylinder 29 and the cylinder 29 is rotated clockwise. The pin 35 moves upwardly and to the right in the direction of the arrow in FIG. 3 to retract the latch member 37 from recess 43 while the pin rides upwardly along the right edge 36' of the slot 36 until the pin reaches the position at the top of edge 36' as shown at the right in FIG. 3. The latch member 37 is now fully retracted from the recess 43 in support 25. Continued rotation of the cylinder causes the locking member 28 to undergo clockwise rotation through an angle of 90° to the unlocking position. The support 25 is provided with a second recess 43' into which latch member 37 enters under the action of spring 42, in the unlocked position to resist removal of the locking member 28 from the support 25 thereby supplementing the action of retainer 44. The rounded shape of the edge of the latch member 37 and the formation of a rounded portion 48 of the support 25 provides for a camming action to fully depress the latch member 37 in the rotatable member 28 as the latter begins its 90° rotation in the support 25 to the unlocking position. Similarly in reverse movement going from the unlocked to the locked position, the camming action acts to fully depress the latch member 37 into recess 39 prior to its release into the recess 43 in support 25. The rotatable member 28 is lightly held against rotation in the unlocking position by the engagement of the latch member 37 in recess 43' but this is easily overcome by the camming action afforded by rounded portion 48 on the latch member.

At the upper and lower borders of aperture 23, the flanges are provided with projecting portions 47 (FIG. 4) which in the locked position of rotatable member 28 face the same and prevent rearward movement thereof as shown in FIG. 4. The projecting portions 47 also serve to strengthen the brackets at the apertures 23.

In a mounting operation, the rotatable member 28 is unlocked and aligned with the raised portion 27 of support 26 and passed through the aperture 23 in the bracket. Then the rotatable member 28 is turned 90° so that the latch member 37 is projected into recess 43 under the action of spring 42. In this position the rotatable member is now locked and extends across the aperture 23.

The installation of the device is as follows:

At a selected location on a support 49 to which the device is to be mounted, screws or similar fasteners 50 are inserted through holes 15, 16 in bracket 3 so as to secure the bracket to the support 49. The second bracket is then telescopically engaged in the slots 6, 7 in bracket 3 such that the flanges 20 and 21 are spaced relatively far apart in the manner as shown in FIG. 5.

The support members 26 of two lock devices 22 are secured to opposite side walls of article 1 by means of fasteners 31. The lock devices 22 are mounted in substantially aligned position. The location of the lock devices is initially so determined that when they are engaged with the flanges 20,21 sufficient clearance will exist between the top of the article and the lower edge of the telescoping bracket members. Preferably, this clearance is made as small as possible so as to preclude access to the screws 50 after the article is installed.

Figure 5:
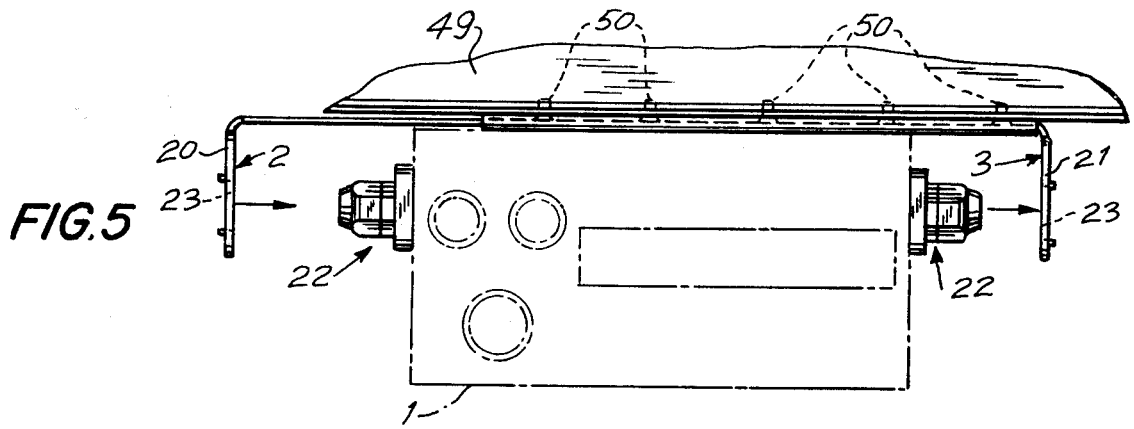
FIG. 5 is a front view diagrammatically illustrating a first stage in the installation of an electronic instrument in the mounting and locking means of the invention.
Figure 6:
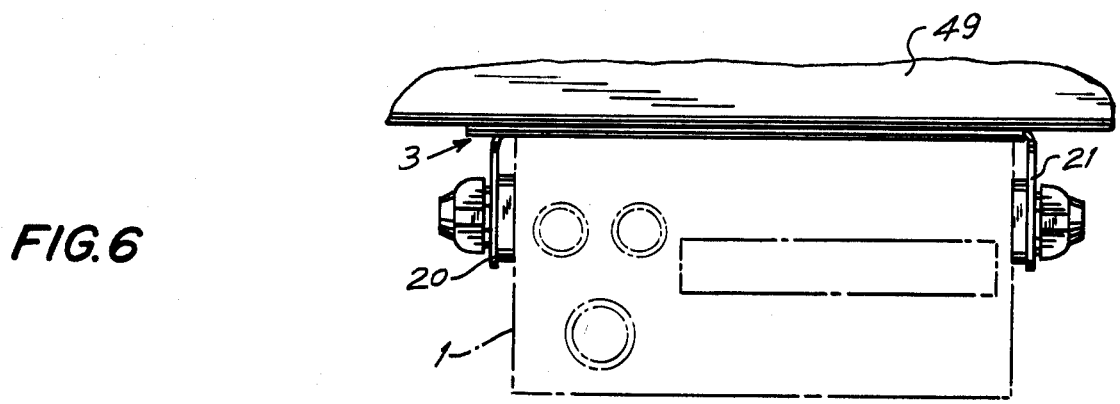
FIG. 6 is a similar front view showing the completed installation of the electronic instrument.

When the lock devices 22 have been attached to the side walls of the article, the article is introduced between the flanges 20, 21 as shown in FIG. 5. Thereafter, the lock device at the right in FIG. 5 is inserted through the aperture 23 in the flange 21 and turned to its locked position whereafter the telescoping member 2 is moved to the right until the aperture 23 thereof receives the other lock device which is then turned to the locked position. The article is now securely and safely locked in place. It is to be noted that after the article has been locked in place the flanges 20 and 21 cover the face of the screws 31 precluding access thereto.

In order to remove the article, it is a simple matter of first unlocking the lock in aperture 23 of flange 2 so that the flange 20 can then be moved away from the flange 21 by withdrawing telescoping member 2 from member 3. Then the other lock is unlocked and the article is now free to be removed.

Although the invention has been described in relation to an electronic instrument which is to be attached by means of a telescoping bracket to a support, numerous modifications and variations are possible within the framework of the invention. Thus, the lock device of the invention is applicable to any article which is to be secured to a support and such article need not be an electronic instrument. Moreover, the bracket may take various forms and need not be of the telescoping form as disclosed. Thus, as shown in FIG. 7 a support 25 of the lock device described hereinabove is affixed to a support 1'. The locking member 28 is brought to its unlocked position as shown and is introduced through the aperture 23' so as to extend on the other side of the bracket 60. The bracket 60 is in the form of a hinge mount comprising a mounting portion 61 with holes 62 therein for fasteners to secure position 61 to a support (not shown). Leaf members 63 and 64 of the bracket 60 are connected by a hinge 65. By means of a bracket of this construction, article 1' can be attached to a structural support of any type.

It is to be appreciated that the bracket can take any of a multitude of configurations for enabling an article to be securely and detachably connected to a support.

It will now become apparent to those skilled in the art that departures from the disclosed embodiments can be made within the spirit and scope of the invention as defined by the appended claims.

What is claimed is:

1. A device for attaching and locking an article to a mounting structure, said device comprising a locking means having locked and unlocked states, a support means supporting said locking means thereon for displacement between first and second positions corresponding respectively to said locked and unlocked states, said support means being adapted for attachment to an article, and bracket means adapted for attachment to a mounting structure, said bracket means having an aperture shaped to allow passage of said locking means therethrough such that in said locked state of the locking means said locking means blocks removal thereof from said bracket means via said aperture, while in the unlocked state of the locking means said locking means can be passed through the aperture to be separated from the bracket means.

2. A device as claimed in claim 1 wherein said support means is shaped to prevent complete passage thereof through said aperture.

3. A device as claimed in claim 1 wherein said locking means is rotatably supported by said support means for movement between said locked and unlocked positions.

4. A device as claimed in claim 3 wherein said aperture in the bracket means is non-circular, said locking means comprising an elongated locking member which in said locking position extends across said aperture and blocks passage therethrough whereas in said unlocking position the locking member is confined within the outline of said aperture to pass freely therethrough.

5. A device as claimed in claim 4 wherein said aperture and locking member have the same shape.

6. A device as claimed in claim 4 wherein said support means comprises a base plate supporting the locking member, said base plate including a raised portion engaging in said aperture so as to be non-rotatable therein.

7. A device as claimed in claim 6 wherein said locking member includes a spring biassed latch engaged in a recess provided in said base plate in locked position of the locking means, said latch being retractable against the spring bias thereof to move out of said recess so that the locking member can be rotated to said unlocked position and said locking member can be passed through said aperture in the bracket means.

8. A device as claimed in claim 6 wherein said locking member is key operated to go from the locked to the unlocked state.

9. A device as claimed in claim 1 wherein said bracket means comprises a telescoping bracket member having opposite flanges thereon whose spacing is adjusted by the degree of telescoping of the bracket member, one of said flanges being provided with said aperture, said locking means being lockable in said aperture.

10. A device as claimed in claim 9 wherein each flange of the bracket member has one said aperture therein and one said locking means is mountable in a respective aperture.

11. A device as claimed in claim 9 wherein said support means has holes for passage of fasteners for attachment of the support means to the article, said holes being covered by said one flange when the locking means is mounted in said aperture therein.

12. A device as claimed in claim 9 wherein said telescopic bracket member has holes therein for attachment to the mounting structure.

13. A device as claimed in claim 1 wherein said bracket means includes projecting members bounding said aperture and positioned to face the locking means to oppose displacement thereof in a direction through the aperture in the bracket.

14. A device as claimed in claim 1 wherein said support means includes a portion which is shaped to be non-rotatably engaged in said aperture.

15. A device as claimed in claim 1 wherein said bracket means has opposite surfaces, said support means including a base plate positionable adjacent one surface of said bracket means, said locking means being positionable adjacent the other surface of said bracket means.

16. A device as claimed in claim 15 wherein said base plate is larger than said aperture so as not to be passable therethrough.

17. A method of selectively locking an article to a bracket, said method comprising forming said bracket as a telescoping member having opposed depending flanges whose spacing can be adjusted by regulating the degree of telescoping of the bracket, said bracket having apertures therein, attaching two locking members to an article at opposite sides thereof, positioning the article between the flanges, passing the locking members through the apertures, and locking said locking members so that they cannot be passed in reverse through said apertures.

18. A method as claimed in claim 17 wherein said locking members are locked by turning the same.

19. A method as claimed in claim 18 wherein said aperture and locking members are formed with the same non-circular shapes.

* * * * *